United States Patent [19]

Gaura et al.

[11] 4,208,847

[45] Jun. 24, 1980

[54] LATERAL ADJUSTMENT STRUCTURE FOR TELESCOPING BOOM ASSEMBLY

[75] Inventors: Charles F. Gaura; John C. Volkman, both of Wausu; Charles Cramlet, Rothschild, all of Wis.

[73] Assignee: J. I. Case Company, Racine, Wis.

[21] Appl. No.: 15,469

[22] Filed: Feb. 26, 1979

[51] Int. Cl.[2] ........................ E04H 12/34; F16C 17/00

[52] U.S. Cl. ........................................ 52/118; 52/632; 212/55; 308/3 R

[58] Field of Search .................. 52/118, 632; 212/144, 212/55; 308/3 C, 3.9, 3 R; 248/657, 354 C, 354 P, 354 R

[56] References Cited

U.S. PATENT DOCUMENTS

| | | | |
|---|---|---|---|
| 3,171,545 | 3/1965 | Knight | 212/144 |
| 3,398,492 | 8/1968 | Nansel | 212/55 |
| 3,952,466 | 4/1976 | Spain | 52/118 |
| 4,134,236 | 1/1979 | Ott | 52/118 |
| 4,148,531 | 4/1979 | Hornagold | 212/55 |

*Primary Examiner*—John E. Murtagh
*Attorney, Agent, or Firm*—Dressler, Goldsmith, Shore, Sutker & Milnamow, Ltd.

[57] ABSTRACT

A structure is provided for adjusting the lateral displacement of an outer second boom relative to a first, or base boom which receives and supports the second boom for telescoping movement relative thereto. A box-like retainer structure is provided to receive a pair of wear blocks which project from the retainer structure on each side of the second boom and are adapted to slidingly engage the inner surface of the sides of the base boom. A pair of threaded adjustment blocks are provided, one block inwardly of and adjacent each wear block for retaining the wear blocks against the base boom. Each adjustment block is threadingly engaged with a separate bolt and the distal end of each bolt opposite the adjustment block is retained within a bore of an upstanding wall to prevent each bolt from moving laterally relative to the second boom but to permit rotation of the bolts. The box-like retainer structure prevents rotation and vertical displacement of the wear blocks and adjustment blocks so that when a bolt is rotated, the engaged adjustment block is moved longitudinally relative thereto to vary the lateral displacement of the adjacent wear block and hence the lateral displacement of the second boom relative to the first or base boom.

12 Claims, 3 Drawing Figures

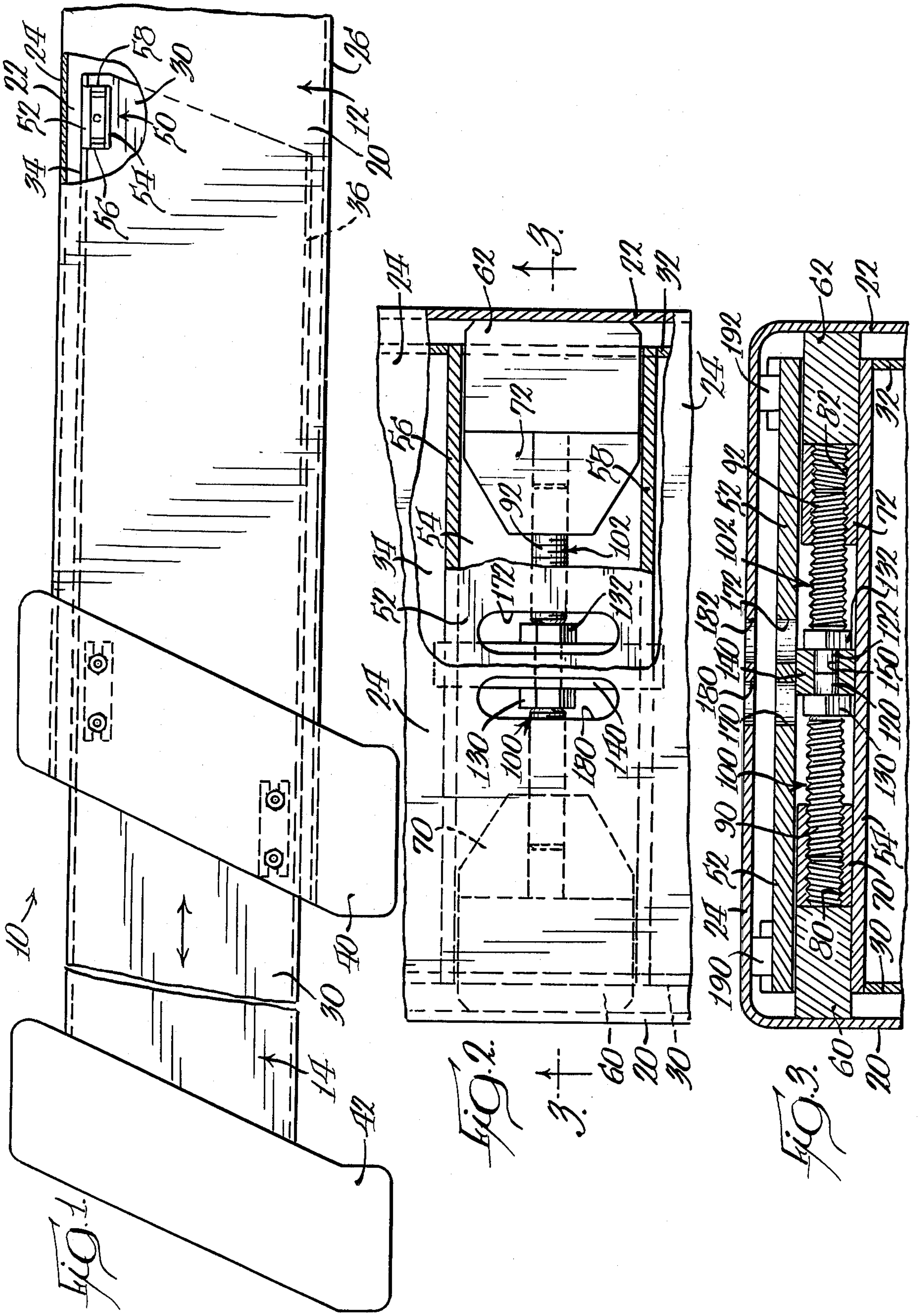

LATERAL ADJUSTMENT STRUCTURE FOR TELESCOPING BOOM ASSEMBLY

DESCRIPTION

Technical Field

This invention relates to a telescoping boom assembly such as the kind used in mobile equipment where it is desired to move a particular working member from a retracted position to an extended position. Typically such telescoping boom assemblies are employed in cranes as the crane boom or in personnel lift apparatus in which a personnel-carrying basket is mounted at the end of a boom. The boom assemblies comprise at least a first or base boom and a second or outer boom telescopingly received in the first boom and adapted for longitudinal movement relative thereto.

In particular, the present invention relates to a structure for adjusting the lateral displacement of one boom inside of and relative to another boom.

Background Art

In a telescoping boom assembly, a first or base boom, generally of a rectangular cross section, is mounted to receive a portion of a second boom, also of a generally rectangular cross section, but having smaller dimensions than the first boom so that the second boom can be slidably received within the first boom. Typically, the second boom is guided within the first boom at two general locations. First, guide members may be employed at the open end of the first boom to guide the second boom as it reciprocates. The second boom may also be guided at the inner end of the second boom, i.e., the end which is received within the first boom.

In order that the second boom reciprocates in general alignment with the first boom, it is necessary that the second boom be aligned so that its sidewalls are generally parallel to the sidewalls of the first boom. In particular, it is desired to avoid significant lateral skewing of the second boom with respect to the first boom. To this end, a guide block or wear block may be secured to each lateral side of the second boom near the inner end of the boom.

In the past, it was possible with some boom assemblies to adjust the wear blocks laterally relative to the second boom by the addition of shim plates between the wear block and the second boom. Where such shimming was possible, the wear blocks had to be removed and the shims inserted. Then the wear blocks had to be resecured to the second boom.

SUMMARY OF THE INVENTION

The present invention provides a novel structure to facilitate adjustment of the lateral displacement of a second boom relative to a first boom in a telescoping boom assembly. The novel adjustment structure eliminates the need for using specially fabricated shim stock or plates, eliminates the need to remove the wear block from the boom assembly in order to make the lateral adjustment, and provide a savings in time and labor when making the lateral adjustment.

In the preferred embodiment of the present invention, a first boom is provided with a portion having a generally rectangular cross section for receiving one end of a second boom which also has a generally rectangular cross section and which telescopically reciprocates relative to the first boom. Each boom has a pair of opposed sidewalls, a top wall and a bottom wall. A pair of spaced apart wear blocks are provided to engage the inner surfaces of the opposed side of the first boom and to transmit lateral loading between the first and second booms. To this end, the wear blocks are disposed on opposite sides of the second boom in a box-like retainer structure and are slidably supported on a bottom wall of the retainer structure. Each wear block projects outwardly some amount from the retainer structure beyond the sidewall of the second boom and is in contact with the inner surface of the adjacent sidewall of the surrounding first boom.

A pair of spaced-apart threaded adjustment blocks are provided for holding the wear blocks against the first boom. Each adjustment block is disposed within the box-like retainer, inwardly of a wear block, and is adapted to slide on the bottom wall of the retainer structure to move a wear block against the first boom.

Each adjustment block is threadingly engaged with a bolt which is also entirely disposed within the box-like retainer structure. Opposite the threaded end engaged with the adjustment block, each bolt has a cylindrical end or dowel which is received in a mating bore of an upstanding medial wall secured to the second boom. Each bolt also has a bolt head intermediate the dowel end and threaded end for being engaged to rotate the bolt relative to the engaged adjustment block.

The box-like retainer structure includes a horizontal retainer wall disposed horizontally above the wear blocks, adjustment blocks, and bolts. The retainer wall is in close fitting relation with the adjustment blocks and wear blocks lying beneath it so as to prevent the adjustment blocks and wear blocks from being displaced upwardly and to prevent the wear blocks and adjustment blocks from being rotated relative to the bolts.

The structure is operated by rotating the bolts as necessary to cause the threaded adjustment blocks to move laterally relative to the second boom to thereby vary the lateral displacement of the wear blocks relative to the second boom and thereby vary the lateral displacement of the second boom relative to the first boom.

Thus, it is seen that the combined effect of the various elements associated in accordance with the present invention is greater than the sum of the several effects of those elements taken separately. The novel combination of elements in accordance with the present invention yields desirable, beneficial and synergistic results--results which are not only unusual and surprising, but also provide a substantial improvement over the prior art.

Numerous other advantages and features of the present invention will become readily apparent from the following detailed description of the invention and embodiments thereof, from the claims and from the accompanying drawings.

BRIEF DESCRIPTION OF THE DRAWINGS

In the accompanying drawings forming part of the specification, and in which like numerals are employed to designate like parts throughout the same, FIG. 1 is a fragmentary side elevation view of a telescoping boom assembly partially broken away to show the lateral adjustment structure of the present invention;

FIG. 2 is an enlarged fragmentary plan view of a portion of the boom assembly illustrated in FIG. 1 and partially broken away to more clearly show the lateral adjustment structure; and FIG. 3 is a fragmentary cross-sectional view taken generally along the plane 3—3 in FIG. 2.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The precise shapes and sizes of the components herein described are not essential to the invention unless otherwise indicated, since the invention is described with reference to an embodiment which is simple and straightforward.

A portion of a telescoping boom assembly 10 is illustrated in FIG. 1. The boom assembly 10 has a first boom or base boom 12 which is typically adapted to be mounted to a frame or turret (not illustrated but would be attached to the base boom 12 at the right-hand side of FIG. 1). A second boom 14 is mounted within the first boom 12 in a telescoping manner and is adapted to be reciprocated relative to the first boom 12.

Of course, additional telescoping boom members may also be included, such as a third boom (not illustrated) slidably received in the second boom 14. Typically, the boom assembly 10 is adapted to be pivoted about a horizontal operating axis through a vertical arc by suitable means (not illustrated) operably connected with the stationary base or first boom 12.

The boom assembly has certain conventional drive mechanisms and control mechanisms which are not illustrated but which function to move the second boom 14 relative to the stationary first boom 12. Such mechanisms are well-known to those having skill in the art and having an understanding of the necessary functions of such mechanisms. They are not illustrated or described herein as they form no part of the present invention.

Typically, the first boom 12 has a generally rectangular cross section with a pair of opposed sidewalls 20 and 22 (FIG. 3), a top wall 24, and a bottom wall 26 (FIG. 1). Similarly, the second boom typically has a generally rectangular cross section with a pair of opposed sidewalls 30 and 32 (FIG. 3), a top wall 34, and a bottom wall 36 (FIG. 1). Boom end frame members 40 and 42 are welded to the outer or distal ends of the first boom 12 and second boom 14, respectively.

It is desired to have the second boom 14 aligned with the first boom 12 so that the corresponding walls of each boom member are generally parallel. In other words, it is desirable to avoid a skewing of the second boom 14 with respect to the first boom 12 in order that the second boom 14 can reciprocate easily and with a minimum of friction.

In existing boom assemblies, wear pads or blocks are typically provided on the second boom 14 at its inner end inside of the first boom 12. These wear blocks contact the inside surfaces of the opposed sidewalls of the first boom 12 to maintain the second boom 14 at a predetermined spacing from each sidewall of the first boom. Typically, the wear blocks abrade or wear down and must be replaced and/or shimmed outwardly to maintain proper clearances between the second and first booms.

According to the present invention, a novel boom assembly lateral adjustment structure is provided to permit the wear blocks to be easily adjusted and to permit the wear blocks to be adjusted without the use of special shims. The adjustment structure is provided at the rear end of the second boom 14 as generally illustrated in the cut-away section in FIG. 1. The details of the structure are more clearly illustrated in the enlarged views in FIGS. 2 and 3. The adjustment structure is contained within a retainer means 50 (FIG. 1) which is integral with and secured to the second boom 14.

The retainer means or structure 50 includes a box-like enclosure comprising a first wall member 52 generally coplanar with the top wall 34 of the second boom, a second wall member 54 spaced below and generally parallel to first wall member 52, a front sidewall member 56, and a rear sidewall member 58. The box formed by the wall members 52, 54, 56, and 58 has the general shape of a right rectangular prism and functions to contain therewithin the other elements of the adjustment structure of the present invention.

With reference to FIG. 3, wear blocks 60 and 62 are provided within the retainer structure and are adapted to engage a portion of the inner surface of the first boom sidewalls 20 and 22, respectively. The wear blocks 60 and 62 are typically made of a low friction material to prevent excessive wear and to prevent excessive resistance when the second boom 14 is reciprocated within the first boom 12. The wear blocks are free to slide laterally with respect to the first and second booms on the second wall 54 within the rectangular box-like retainer structure 50.

The wear blocks 60 and 62 are urged against the sidewalls of the first boom 12 by adjustment blocks 70 and 72, respectively. Each adjustment block 70 and 72 has a threaded bore 80 and 82, respectively, for receiving the threaded distal end portion 90 and 92, respectively, of a bolt 100 and 102, respectively. Together, a wear block (e.g., wear block 60) and the associated adjustment block (e.g., adjustment block 70) can be regarded as constituting a threaded, adjustable wear block means for moving against a portion of the inner surface of the first boom 12.

Bolts 100 and 102 each have a generally smooth cylindrical distal end portion or dowel 120 and 122, respectively, opposite the threaded end. Each bolt 100 and 102 has a head 130 and 132, respectively, located between the bolt ends.

As best illustrated in FIG. 3, the box-like retainer structure 50 includes an upstanding medial wall 140 between the upper first wall member 52 and lower second wall member 54. The medial wall 140 is fixed relative to the second boom 14, preferably as illustrated in FIG. 2, by distal end portions which extend through a slot in the front sidewall 56 and through a slot in the rear sidewall 58. In this manner, medial wall 140 is restrained from movement laterally and vertically with respect to the second boom 14.

The medial wall 140 also defines a bore 150 which has a longitudinal axis generally parallel to the top wall 54 of the second boom 14 and generally coincident with the longitudinal axes of the bolts 100 and 102. The dowel ends 120 and 122 of the bolts 100 and 102, respectively, are received in and retained by the bore 150 in the medial wall 140. The bolt heads 130 and 132 of the bolts 100 and 102, respectively, butt up against the medial wall 140 and thus prevent any inward lateral movement of the bolts.

To permit access to the bolt heads 130 nand 132, a pair of slots 170 and 172 are provided in the first wall member 52 of the retaining structure 50. For the same purpose, another pair of slots 180 and 182 are provided in the top wall 24 of the first boom 12.

Rotation of the bolt heads 130 and 132 causes rotation of the bolts 100 and 102, respectively, which moves the adjustment blocks 70 and 72 laterally within the retainer structure 50. By appropriate adjustment of the bolts 100 and 102, the adjustment blocks 70 and 72 can be moved to force the wear blocks 60 and 62 against the interior surfaces of the sidewalls 20 and 22 of the first boom 12. With this novel adjustment structure, it is seen that the lateral displacement of the second boom 14 can be easily varied without the use of special shim plates and without requiring the disassembly of the booms or wear blocks.

If desired, additional guides or wear blocks 190 and 192 may be provided, as illustrated in FIG. 3, on the top of the first wall 52 of the retainer structure 50 for engaging the underside of the top wall 24 of the first boom 12 and thereby provide a vertical alignment guiding structure for the boom assembly. Of course, additional vertical alignment guides or structures may be provided elsewhere in the boom assembly, including at the outer end of the first boom 12, though such additional guides are not illustrated because they may be of conventional design known to those skilled in the art and because they form no part of the present invention.

If desired, the dowel end portion 120 and 122 of each bolt 100 and 102, respectively, may have a bore passing through the diameter with a nylon plug inserted in the bore and extending to the exterior cylindrical surface of the dowel portion to serve as shelf-locking devices within the medial wall 140.

The novel adjustment structure of the present invention is easily assemblied. One method of assembling the structure consists of screwing each adjustment block onto its respective adjustment bolt and then placing the screwed-together assembly into the retainer structure 50 in the rear of the second boom 14. In doing this, the dowel end of each bolt is inserted into the bore 150 of the medial wall 140. Next, the wear blocks 60 and 62 are inserted into the retainer structure 50 until they abut the adjustment blocks 70 and 72, respectively. The second boom is then inserted into the first boom and the bolts 100 and 102 are adjusted to move the wear blocks 60 and 62 outwardly the desired amounts to provide proper lateral alignment of the second boom within the first boom.

Although the preferred embodiment is illustrated and described as having wear blocks 60 and 62 which are separate from the adjustment blocks 70 and 72, respectively, it is to be understood that the ajustment blocks and wear blocks could be combined into one integral or unitary element. However, though such a structure may have certain advantages, it would not have the advantage of the preferred embodiment described above wherein the wear blocks can be easily removed and replaced, if necessary, without having to threadingly disengage the bolts 100 and 102.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. In a telescoping boom assembly having at least a first boom and a second boom wherein said first boom is adapted to receive a portion of a second boom therein and wherein said first and second booms are adapted to be laterally aligned through the transmission of lateral loading between said first and second booms, an improvement for adjusting the lateral displacement of said second boom relative to said first boom, said improvement comprising:

threaded adjustable wear block means for moving against a portion of said first boom;

bolt means for threadingly engaging said threaded adjustable wear block means;

retainer means for restraining said adjustable wear block means against rotation relative to said bolt means and for retaining said bolt means in a fixed lateral position relative to said second boom while permitting said bolt means to be rotated by the application of an externally applied torque; and engageable means provided on said bolt means for being engaged to rotate said bolt means relative to said threaded adjustable wear block means whereby said threaded adjustable wear block means is moved relative to said second boom to thereby vary the lateral displacement of said threaded adjustable wear block means relative to said second boom and thereby vary the lateral displacement of said second boom relative to said first boom.

2. The improvement in accordance with claim 1 in which said threaded adjustable wear block means includes at least one separately slidable wear block and at least one threaded adjustment block means for engaging and moving said wear block against a position of said first boom.

3. The improvement in accordance with claim 2 in which said retainer means includes wall means fixed relative to said second boom for receiving a portion of said bolt means.

4. The improvement in accordance with claim 1 in which each said first and second boom has a generally rectangular cross section; in which each said first and second boom has a pair of opposed sidewalls and opposed top and bottom walls; and in which said adjustment block means is disposed below the top wall of said second boom for moving at least one of said wear blocks against one of said sidewalls of said first boom.

5. The improvement in accordance with claim 3 in which said boom assembly has two spaced-apart wear blocks and in which said adjustment block means includes two spaced-apart adjustment blocks, each adjustment block being adapted to engage and move a wear block against a sidewall of said first boom.

6. The improvement in accordance with claim 4 in which said retainer means further includes a retainer box and in which said adjustment block means is slidably received in said box to prevent rotation of said adjustment block means relative to said bolt means.

7. In a telescoping boom assembly having at least a first boom and a second boom received in said first boom wherein said second boom is laterally adjustable relative to said first boom and having at least one wear block adapted to engage a portion of said first boom and transmit lateral loading between said first and second booms, the improvement comprising:

threaded adjustment block means for engaging said wear block and moving said wear block against said first boom;

bolt means for threadingly engaging said threaded adjustment block;

retainer means for retaining said bolt means in a fixed lateral position relative to said second boom while permitting said bolt means to be rotated by the application of an externally applied torque; and means integral with said bolt means for being engaged to rotate said bolt means relative to said threaded adjustment block means whereby said threaded adjustment block means is moved relative to said second boom to vary the lateral displacement of said wear block relative to said second boom and thereby vary the lateral displacement of said second boom relative to said first boom.

8. A telescoping boom assembly comprising:

a first boom having a portion generally rectangular in cross section;

a second boom having a portion generally rectangular in cross section and adapted to be received within said first boom for telescopically reciprocating relative to said first boom;

a pair of spaced-apart wear blocks adapted to engage opposed sides of said first boom and transmit lateral loading between said first and second booms;

a pair of spaced-apart threaded adjustment blocks, each said adjustment block disposed inwardly of one of said wear blocks and adapted to move said wear block against said first boom;

a pair of bolts disposed inwardly of said wear blocks, each said bolt having a first end and a second end and threadingly engaged with one of said threaded adjustment blocks on said first end, each bolt further having a bolt head between said first and second ends for being engaged to rotate said bolt relative to the threadingly engaged adjustment block; and a medial bolt retainer wall fixed relative to said second boom, movable therewith, and receiving said second end of each of said bolts to retain each of said bolts in a fixed lateral position relative to said second boom while permitting said bolts to be rotated by the application of an externally applied torque whereby rotation of said bolts moves said adjustment blocks relative to said second boom to thereby vary the lateral displacement of said wear blocks relative to said second boom and thereby vary the lateral displacement of said second boom relative to said first boom.

9. The assembly in accordance with claim 8 in which:

said first boom comprises a pair of opposed sidewalls and an opposed top and bottom wall;

said second boom comprises a pair of opposed sidewalls and a top and bottom wall;

said assembly further includes spaced-apart, parallel first and second wall members spaced from and generally parallel to said top wall of said first boom and secured to said second boom, said medial bolt retainer wall extending between said first and second wall members; and each said adjustment block defines a threaded bore for receiving and threadingly engaging said first end of one of said bolts.

10. The assembly in accordance with claim 9 in which said first wall member defines apertures over said bolts to permit access to the heads of said bolts.

11. The assembly in accordance with claim 10 in which said top wall of said first boom defines apertures for permitting access to the heads of said bolts.

12. The improvement in accordance with claim 8 further including guide members mounted to said first wall member for engaging said top wall of said first boom on the interior of said first boom and thereby guiding the movement of said second boom within said first boom at a fixed spacing between the respective top walls of said first and second booms.

* * * * *